US010313455B2

United States Patent
Quan et al.

(10) Patent No.: US 10,313,455 B2
(45) Date of Patent: Jun. 4, 2019

(54) DATA STREAMING SERVICE FOR AN INTERNET-OF-THINGS PLATFORM

(71) Applicant: Ayla Networks, Inc., Santa Clara, CA (US)

(72) Inventors: Wayland William Quan, San Jose, CA (US); Vikram Vasantha Kumar, Dublin, CA (US); Sudha Sundaresan, San Jose, CA (US); Ishaan Sutaria, Sunnyvale, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 266 days.

(21) Appl. No.: 15/251,516

(22) Filed: Aug. 30, 2016

(65) Prior Publication Data

US 2017/0063946 A1    Mar. 2, 2017

Related U.S. Application Data

(60) Provisional application No. 62/212,447, filed on Aug. 31, 2015.

(51) Int. Cl.
| | | |
|---|---|---|
| *G06F 15/16* | (2006.01) | |
| *H04L 29/08* | (2006.01) | |
| *H04L 29/06* | (2006.01) | |

(52) U.S. Cl.
CPC ............ *H04L 67/20* (2013.01); *H04L 63/083* (2013.01); *H04L 67/26* (2013.01); *H04L 63/10* (2013.01)

(58) Field of Classification Search
USPC .................................. 709/206, 202, 231, 235
See application file for complete search history.

(56) References Cited

U.S. PATENT DOCUMENTS

| | | | |
|---|---|---|---|
| 2006/0168080 A1 | 7/2006 | Surlaker et al. | |
| 2009/0282246 A1 | 11/2009 | Gunther | |
| 2010/0309783 A1* | 12/2010 | Howe | H04L 43/0852 370/230 |
| 2010/0325220 A1 | 12/2010 | Skinner et al. | |
| 2011/0179020 A1 | 7/2011 | Ozzie et al. | |
| 2014/0040364 A1 | 2/2014 | Baldwin et al. | |
| 2014/0143358 A1 | 5/2014 | Beausoleil et al. | |
| 2016/0006805 A1* | 1/2016 | Ulupinar | H04L 67/02 709/217 |
| 2017/0006135 A1* | 1/2017 | Siebel | H04L 67/02 |

OTHER PUBLICATIONS

International Search Report and Written Opinion of the International Searching Authority for International application No. PCT/US2016/049673 dated Nov. 21, 2016, 13 pages.

* cited by examiner

*Primary Examiner* — Lan Dai T Truong
(74) *Attorney, Agent, or Firm* — Lowenstein Sandler LLP

(57) ABSTRACT

A processing device receives a subscription request to a streaming data feed, the subscription request specifying one or more devices and at least one device property. The processing device generates the streaming data feed. The processing device receives a plurality of event messages, each of the plurality of event messages comprising data for an event that occurred on a device. The processing device determines a set of event messages from the plurality of event messages, wherein event messages in the set of event messages are associated with the one or more devices and the at least one device property. The processing device sends the set of event messages to a subscriber that subscribes to the streaming data feed.

21 Claims, 8 Drawing Sheets

DATA STREAMING SERVICE FOR AN INTERNET-OF-THINGS PLATFORM

RELATED APPLICATIONS

The Present application claims the benefit of U.S. Provisional Patent Application No. 62/212,447 filed Aug. 31, 2015, which is incorporated by reference herein.

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

The internet-of-things (IoT) is an environment of a myriad of consumer devices connected to the Internet or another network. This myriad of consumer devices generates a large amount of data that may be useful to entities such as manufacturers of the devices, retailers, and so forth.

BRIEF DESCRIPTION OF THE DRAWINGS

Reference will now be made to the accompanying drawings showing example embodiments of the present application, and in which.

DESCRIPTION OF EXAMPLE EMBODIMENTS

The Internet of Things (IoT) evolution has enabled consumers and original equipment manufacturers (OEMs) to interact with their connected devices in unprecedented ways. For OEMs building connected devices, obtaining data from their devices offers a wealth of information. Typical use cases include analytics, auditing and troubleshooting.

Embodiments are directed to a network-connected device platform (also referred to as an internet-of-things (IoT) cloud platform or simply an IoT platform) that provides a high speed data transfer from the IoT platform to partners and clients. Millions of devices are able to connect to the IoT platform, which may provide an ongoing flow of device data. The IoT platform includes a data stream system that allows external partners to retrieve device data from the IoT platform. The external partners are then able to perform their own data analysis and data storage in their own computer network and trust domain in a real time (or near real time) basis. The data stream system offers a subscription based mechanism that enables an IoT federation between the IoT platform and partners (e.g., third party servers).

In one embodiment, a processing device receives a subscription request to a streaming data feed, the subscription request specifying one or more devices and at least one device property. The processing device then receives a connection request and opens a long-lived asynchronous connection to a subscriber. The processing device generates the streaming data feed, which includes generation of a message queue. The processing device then receives multiple event messages, each of which includes data for an event that occurred on a device. The processing device determines which of the event messages are associated with the one or more devices and the at least one device property. The processing device then adds such event messages to the message queue. The messages in the message queue are then streamed to the subscriber over the long-lived asynchronous connection.

Figure 1:
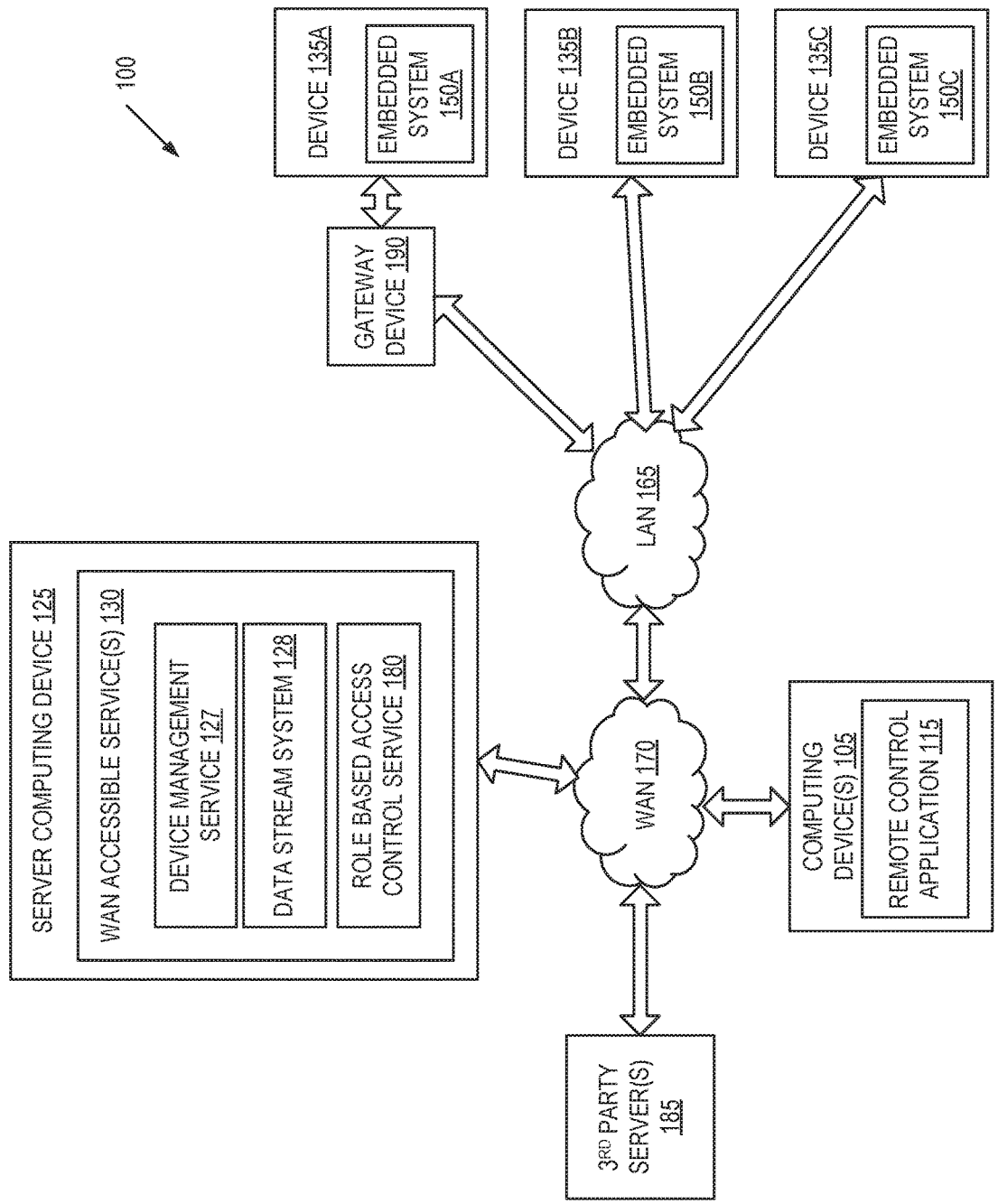
FIG. 1 is a block diagram depicting an example network architecture, in accordance with embodiments described herein.

Referring now to the figures, FIG. 1 is a block diagram depicting an example network architecture 100 including remotely accessible embedded systems and computing devices that interact with the embedded systems. The network architecture 100 includes multiple devices 135A-C connected to a local area network (LAN) 165. The devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. Devices 135A-C may also be any other type of device that includes an embedded system. In one embodiment, the devices 135A-C are modeled as sets of properties.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to a LAN 165 or to a wireless carrier network (e.g., that is implemented using various data processing equipment, communication towers, etc.). The communication module may be configured to manage security, manage sessions, manage access control, manage communications with external devices, and so forth. In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 may include a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135A may support Zigbee or Bluetooth. To enable such a device to connect to the LAN 165, the LAN 165 may include a gateway device 190 connected to the network device via one of the connection types supported by the network device (e.g., via Ethernet or Wi-Fi). The gateway device 190 may additionally support other communication protocols such as Zigbee, PLC and/or Bluetooth, and may translate between supported communication protocols. Accordingly, some devices (e.g., device 135A) may connect to the LAN 165A through the gateway device 190.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to a server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts one or more WAN accessible services 130, which may be a web based service and/or a cloud service (e.g., a web based service hosted in a cloud computing platform). The WAN accessible services 130 may be components of an IoT platform that OEMs can leverage to quickly and easily create new network-connected device products. The IoT platform will handle authorization and authentication, network connection, information gathering and analytics, device management, role based access control, data streaming of device data to subscribers, and more. WAN accessible services 130 in one embodiment include a device management service 127, a data stream system 128 and a role based access control service 180.

The device management service 127 may maintain a session (e.g., via a continuous or intermittent connection) with one or more of the embedded systems 150A-C. Alternatively, the device management service 127 may periodically establish sessions with the embedded systems 150A-C. Via a session with an embedded system 150A-C, device management service 127 may issue commands to the embedded system and/or receive status updates (e.g., event messages) from the embedded system 150A-C. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Device management service 127 may receive status updates from devices 135A-C (e.g., from embedded systems 150A-C of devices 135A-C) in the form of event messages. Event messages received from the embedded systems 150A-C may identify values or states of some or all detectable properties of devices 135A-C that the embedded systems are included in. Event messages may also include fault information, statistical device usage information, trace data, acknowledgments, connectivity events (e.g., establishment or loss of connection for a device), registration events and/or other information. Such values, states and/or other information may change based on direct user interaction with the devices, based on execution of schedules, based on external input (e.g., measured values), and so on. Such values, states and/or other information may also change responsive to commands sent to the embedded systems 150A-C by the device management service 127 and/or by computing devices 105. By maintaining or periodically establishing sessions with the embedded systems 150A-C, the device management service 127 may receive periodic or continuous event messages and maintain up-to-date information on the states of the devices 135A-C and/or receive other device data.

Data stream system 128 provides streams of device data to subscribers in the form of event messages generated by devices. Streaming data feeds may be set up for specific devices, specific device properties, groups of devices, and so on. For example, data stream system 128 may generate a streaming data feed for all device properties of a single device (e.g., device 135A) or for multiple devices (e.g., devices 135A-C). Data stream system 128 may also generate a streaming data feed for a particular device property of multiple devices. For example, an original equipment manufacturer (OEM) may generate a streaming data feed for a particular device property of all devices manufactured by the OEM.

Devices 135A-C may be modeled as sets of properties. A subscriber can subscribe to a streaming data feed at various levels of groups, devices and/or properties. For example, a subscriber can subscribe to all devices of a particular model (e.g., by specifying a model number and/or version number), to a single device (e.g., by specifying a device serial number), to one property of all devices, to a set of properties of all devices of a particular OEM, to a particular property of a particular device, and so on.

Devices 135A-C may also be arranged into groups, and streaming data feeds may be generated for those groups of devices. Each group may be assigned a group identifier (ID). A group may be generated that includes one or more criteria. Each device that matches the one or more criteria may then be added to the group. Group membership may be determined dynamically based on those devices that meet the criteria at a given time. Devices may belong to multiple different groups concurrently. Examples of groups include groups based on ownership (e.g., all devices owned by a particular user), groups based on location (e.g., all devices at a particular geographic location, at a particular office, etc.), and so on. Devices may additionally or alternatively be placed into arbitrary groups. A subscriber or administrator may specify a specific set of devices to include in a group. These selected devices may or may not share parameters such as device type, location, owner, and so on.

Streaming data feeds may stream device data to subscribers, which may be third party servers 185, web browsers, remote control applications 115, and so on. For each streaming data feed, the data stream system 128 may apply a criterion or set of criteria to filter incoming device data received from devices 135A-C. For example, a streaming data feed that is for a single device would filter out all event messages associated with devices other than the single device based on device serial numbers (DSNs) associated with event messages. Data satisfying the filter criteria may then be streamed to the subscriber. In one embodiment, the data is streamed to the subscriber in real time (or near-real time) as the data is generated and sent to device management service 127.

In one embodiment, server computing device 125 includes a role based access control (RBAC) service 180 that performs authorization and authentication. RBAC service 180 provides role base access control by managing roles and assigning roles to user accounts. Each role provides a set of permissions or privileges with regards to one or more resources (e.g., to one or more devices 135A-C, one or more user resources, etc.).

Roles may include permissions to stream data from particular devices and/or groups. For example, a role associated with a user account may include permissions to stream data of device 135A. If a user desires to stream data from device 135A, the user may subscribe to a streamed data feed that sends data generated by the device 135A. Roles may also include permissions that specify particular device properties, types of event messages, etc. that a user account is authorized to receive in a streamed data feed.

Data stream system 128 may interface with RBAC service 180 when a subscription request is received for a new data stream subscription to determine if a requestor is associated with a role that has access to receive a new streamed data feed associated with the new data stream subscription. The requestor may have a user account, and the user account may have one or more roles assigned. Based on these roles, RBAC service 180 may determine if the requestor has permission to set up and connect to a requested streaming data feed.

Computing devices 105 may include portable devices such as electronic book readers, portable digital assistants, mobile phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may connect to the WAN 170 and/or to the LANs 165A-B.

A computing device 105 may include one or more remote control applications 115 that can receive information for devices 135A-C and control the devices 135A-C. The remote control applications 115 are configured to interface with and/or control one or more of the devices 135A-C via the devices' embedded systems 150A-C. The remote control application 115 may be programmed to run on various operating systems, such as Windows® operating systems, Unix® operating systems, iOS® operating systems, Android® operating systems and Java® operating systems to name a few. The remote control applications 115 may also be configured as firmware, or as hardware, or as some combination of software, firmware and/or hardware. The remote control application 115 may include a graphical user interface (GUI) that enables users to interact with and control devices 135A-C in an intuitive and user-friendly manner. A user may interact with the GUI to cause the remote control application 115 to generate notifications, commands, property updates and other messages for the devices represented in the GUI. The remote control application 115 may additionally provide a user with an ability to opt-in or opt-out of third party services provided by or associated with manufacturers of devices owned by the user.

While computing devices 105 are connected to WAN 170 or directly to LAN 165, remote control application 115 may establish a session with the WAN accessible services 130 using a particular user account associated with that remote control application. The WAN accessible services 130 may provide an interface for indirectly controlling and monitoring one or more of the devices 135A-C associated with that user account.

Additionally, remote control application 115 may set up a data stream subscription and/or a streaming data feed to the remote control application 115. A user may interface with a GUI of the remote control application 115 to generate a subscription request for a data stream subscription and associated streaming data feed. The GUI may provide a menu of available options for creating a streaming data feed. In one embodiment, available options for a streaming data feed are determined based on the user account and a role associated with the user account. The user may navigate through a menu of options to select one or more devices, one or more device properties, one or more event types, and so on for a new streamed data feed.

The remote control application may then generate a subscription request to create a new data stream subscription in accordance with the user selections. The subscription request may be formed in accordance with an application programming interface (API) of the data stream system 128. If the user account associated with the remote control application 115 is associated with a role that has access to the requested data stream subscription (and associated streaming data feed), data stream system 128 may generate the data stream subscription. The data stream subscription may be a data structure or entry in a file or data structure that includes parameters for the streaming data feed and a key (referred to as a stream key) for accessing the streaming data feed.

Once the data stream subscription is generated, at any time the remote control application 115 may send a connection request to the data stream system 128 for a connection to the streaming data feed. The connection request may include the key provided to the remote control application for the data stream subscription. Responsive to the request, data stream system 128 may instantiate the streaming data feed, which may include generating a message queue for the streaming data feed. Event messages meeting particular criteria of the streaming data feed may then be added to the message queue and streamed to the remote control application 115 as the event messages are generated by devices 135A-C.

In one embodiment, the streaming data feed is automatically instantiated and connected to the remote control application 115 when the application is loaded. In one embodiment, streaming data feeds set up by remote control applications are designated as temporary feeds. Instances of such temporary feeds are terminated once the remote control application 115 is closed or the computing device 105 loses a connection to device management service 127.

Third party servers 185 may also interface with data stream system 128 to generate data stream subscriptions and/or establish connections to streaming data feeds. A third party server 185 may log into a specific user account and send a subscription request to the data stream system 128 via an API of the data stream system 128. The subscription request may specify one or more devices, device properties, and/or other parameters to use for generation of a streaming data feed. Data stream system 128 may then query RBAC service 180 to confirm that the user account associated with the third party service 185 includes a role that has permissions to stream requested device data. If the role does have such permissions, data stream system 128 generates a new data stream subscription.

The third party service 185 may then send a connection request to connect to the streaming data feed associated with the data stream subscription, responsive to which the data stream system 128 may instantiate the streaming data feed. An asynchronous long-lived connection may then be formed between the instantiated streaming data feed and the third party service 185. Device data (e.g., event messages) for devices and/or device properties specified in the streaming data feed may then be streamed to the third party service 185.

In one embodiment, streaming data feeds set up for third party servers 185 are persistent feeds. For persistent feeds, data stream system 128 may maintain the streaming data feed and its associated queue even if a connection is lost to the third party server 185. It may be assumed that the third party server 185 will reconnect to the streaming data feed shortly after the connection is lost. Thus, data stream system 128 may continue to populate the message queue of the streaming data feed with event messages even after the third party server 185 loses a connection to the streaming data feed. Once the connection between the third party server 185 and the streaming data feed is reestablished, all of the data from the message queue that was collected during the disconnection may be streamed to the third party server 185. This may reduce a chance that the third party server 185 loses event messages due to network conditions and/or system failures.

Figure 2:
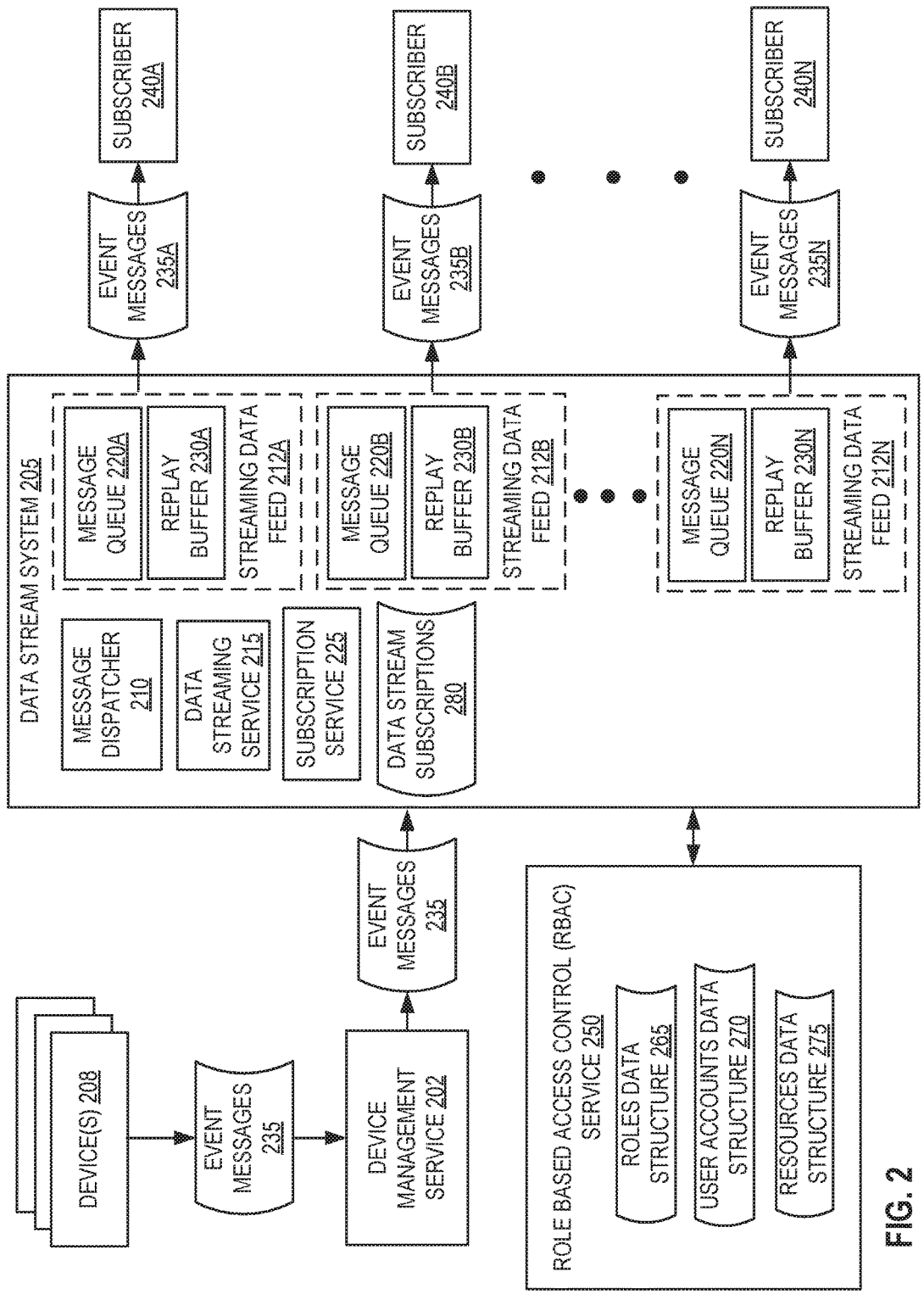
FIG. 2 is a block diagram of one embodiment of a data stream system.

FIG. 2 is a block diagram of one embodiment of a data stream system 205, which in one embodiment corresponds to data stream system 128 of FIG. 1. Data stream system 205 may include a message dispatcher 210, a data streaming service 215, multiple streaming data feeds 212A-N, and a subscription service 225. Alternatively, the functionality of one or more of the message dispatcher 210, data stream service 215, message queue 220, and/or subscription service 225 may be combined into a single module or divided into multiple sub-modules.

The subscription service 225 is responsible for handling subscription requests for streaming data feeds. In one embodiment, the subscription service 215 is a web service. Handling subscription requests may include determining whether a requestor has permissions to receive a requested streaming data feed as well as generating data stream subscriptions 280. If a requestor does have permission to access a requested streaming data feed (e.g., has entitlement to receive specific device data such as specific event messages), subscription service 225 generates a data stream subscription 280 using information included in the subscription request.

Before generating a subscription request, an entity such as a third party server, third party service, user, application running on a mobile device, etc. may attempt to log in to a user account by providing credentials (e.g., user name and password) to an authentication service (not shown). The authentication service verifies that the provided credentials match stored credentials for the user account. If the provided credentials match stored credentials for the user account, the authentication service generates a token for the entity and sends the token to the computing device of the entity. The token may then be presented to any WAN accessible service (e.g., to subscription service 225) of the IoT platform to gain access to resources. Responsive to the computing device presenting the token to subscription service 225, the subscription service 225 may use the token to check which role or roles are associated with the user account, and thus determine which resources the user account has access to as well as the type and level of access.

Entities such as third party servers (or third party services), users, applications running on mobile devices or other devices, and so on may send subscription requests to data stream system 205. A subscription request may include an account identifier for an account and credentials associated with the account. Alternatively, the requesting entity may already be logged into a particular account associated with the data stream system 205, and the subscription request may include a token. The subscription request may additionally include information identifying properties of a requested streaming data feed. The information may specify a specific device (e.g., may include a device identifier for a specific device), a specific device type (e.g., a device model number or a device category), a specific manufacturer, etc. The information may alternatively specify multiple devices (e.g., may include multiple device identifiers for multiple different devices), multiple device types, multiple manufacturers, and so on. The information provided in the subscription request may additionally or alternatively specify types of device data that is desired. The types of device data may include different event types. For example, events may be classified as acknowledgment events, registration events, connectivity events and data point events (also referred to as status update events).

The information provided in the subscription request may additionally or alternatively specify particular device properties for which data point event messages are desired. For example, a thermostat may include device properties of power state, current temperature, and temperature set point. A subscription request may specify one or some of these device properties.

When a subscription request is received, subscription service 225 determines whether to generate a new data stream subscription 280. In one embodiment, subscription service 225 invokes role based access control (RBAC)

service 250 when a new subscription request is received. Subscription service 225 may send the token to RBAC service.

RBAC service 250 can be used to authorize the requestor's entitlement to various resources. There are a number of resources that are managed on the IoT platform. One type of resource is a data streaming resource. RBAC service 250 manages user accounts, roles and resources in the IoT platform, and further manages associations between user accounts, roles and resources.

RBAC service 250 may maintain a roles data structure 265, a user accounts data structure 270 and a resources data structure 275. Each of the data structures 265-275 may be a separate table, spreadsheet, database, or other data structure. Alternatively, the data structures 265-275 may be combined into a single data structure.

Resources data structure 275 may include entries for every resource. Examples of resources include devices, users, firmware images, device templates, and so forth. Device resources may include particular devices and/or components, properties (e.g., attributes, settings, parameters, etc.), data, etc. of particular devices. User resources may include user account information, user demographic information, user behaviors, user purchase history, user historical data, and so forth. Additionally, user resources may be grouped based on original equipment manufacturer (OEM), based on divisions within an OEM, based on dealer, or in other ways. Some access control privileges may be to specific groups of user resources (e.g., to all user resources associated with an OEM). Some resources may have sub-resources, which may be hierarchically arranged. For example, device resources may have sub-resources for properties such as settings/parameters, OEM data (e.g., including analytical, trace, statistical and other data that might not be provided to end users), user data, and so on. User resources may have sub-resources for different types of user data, such as user address, user phone number, user owned devices, etc.

A device resource may be associated with one or more tags. Each tag may represent one or more attributes that are used to determine which roles have access to the device resource and/or sub-resources as well as the level of access (e.g., read or write access, data stream access, etc.). The tags may have fixed values, or may have dynamic values that vary based on conditions. These tags may be used to determine which roles have access to specific resources and/or sub-resources.

One type of access to device data is data stream access. Data stream access may be provided for an entire device or for specific resources of the device (e.g., for particular device properties of the device).

The roles data structure 265 contains an entry for each role. Examples of roles include an OEM role, an owner role, a reseller or dealer role, a maintenance service role, and so on. Each role may have a unique set of privileges for accessing resources. In one embodiment, each role includes one or more tags, each of which may be associated with one or more resources. The tags may have fixed or variable values. In one embodiment, in order for a role to have a privilege to access a resource, a value of a tag associated with that role should be equal to a value of a similar tag associated with the resource. For example, if a tag associated with a role is location=North America, then that role has a privilege to access resources that are located in North America.

A particular role may include data stream access to some or all device properties (and/or other resources) of a device or multiple devices. For example, a role may have data stream access to a first property of a device but may not have data stream access to a second property of the device. In such an example, the role may include a tag associated with a data stream resource for the particular property of the device.

The user accounts data structure 270 includes an entry for each user account. User accounts may include information such as user preferences/settings, user information, user authorization and authentication data (e.g., name and password, biometric data, etc.), devices owned by users, and roles associated with the users.

RBAC service 250 provides granular and flexible controls over which users (e.g., OEMs, owners, maintenance personnel, etc.) can have access to what resources as well as the level of access at any desired level of granularity. Each of the roles may have very granular access to one or more resources based on a rule or set of rules set up by an administrator. For example, within a device there may be several options such as viewing data, changing settings, programming the device, streaming data, and so on. A customer role might have privileges to change the settings (e.g., change a temperature of a thermostat) but not have access to program the device. A dealer role might have privileges to program the device, but not to change settings of the device or stream data from the device.

Subscription service 225 may send a message to RBAC service 250 including information on an account associated with the subscription request. Alternatively, or additionally, the message may include a token that was provided by a requestor to subscription service 225. The message may additionally include indicators of each of the requested resources that will be included in a requested streaming data feed. Examples of such resources include one or more devices, one or more device properties of those devices, one or more types of data (e.g., types of event messages), and so on. RBAC service 250 may then determine one or more roles associated with the account for which the subscription request was received using the token and/or account information. RBAC service 250 may determine whether the account has read access (or specifically data streaming access) to each of the requested resources.

In one embodiment, RBAC service 250 sends a report to subscription service 225 indicating the resources for which the account has read access (or streaming data access) and/or the resources for which the account does not have read access (or streaming data access). In one embodiment, if the requestor has read access (or streaming data access) to all of the requested resources, the RBAC service 250 merely sends a confirmation message indicating that the requestor has authorization for streaming data access to the requested resources.

In one embodiment, the subscription service 225 allows administrators to create an access grant that will enable the data stream subscriptions (e.g., for customer customers) to be authorized before accepting a subscription request (e.g., from a partner). Access grants may be used to grant access to specific streaming data feeds and to set up particular data stream subscriptions without use of RBAC service 250. Access grants may override role based access settings associated with roles and/or resources maintained by RBAC service 250. The access grant may contain filters (e.g., with wildcard support), that can allow a variety of subscriptions for an account (e.g., for a partner or his end-users). In one embodiment, access grants apply to subscriptions, and are created prior to a subscription request. Subscription requests that do not have access grants may fall back to RBAC for authentication or otherwise be forbidden.

In JSON format, one example access grant may look like the following:

```
[
    {
        "OemAccessRule": {
            "id": 7,
            "role": "OEM::DEV1",
            "oem": "0dfc7900",
            "property_name": "*",
            "oem_model": "ledevb",
            "client_type": "cloud",
            "subscription_type": "datapoint",
            "access_grant": true,
            "created_at": "2015-06-25T10:45:02Z",
            "updated_at": "2015-06-25T10:45:02Z"
        }
    }
]
```

This will create a policy in the subscription service 225 that allows new subscription requests from end-users that have role='OEM::DEV1' that also contain the subscription filters listed in the access rule. Thus, if a user with an account having a role of "OEM::DEV2" sends subscription service 225 a subscription request specifying particular resources that were allowed in the access grant, then subscription service 225 may automatically generate a data stream subscription 280 without use of RBAC service 250. These access grants provide a mechanism for OEM device owners to explicitly authorize large classes of subscriptions.

Subscription service 225 determines whether to generate a data stream subscription 280 based on the information received from RBAC service 250 and/or based on comparing a subscription request to one or more access grants. If the requestor has permission to stream data for all of the requested resources, then subscription service 225 may generate a new data stream subscription in accordance with the request. In one embodiment, if the requestor did not have permission to stream data for any of the requested resources, or for a subset of the requested resources, subscription service does not generate a new data stream subscription. Alternatively, if the requestor had permission to stream data for only a subset of the requested resources, subscription service may generate a data stream subscription that will set up a streaming data feed for streaming data associated with the subset of resources that the requestor has permission to stream.

In one embodiment, subscribers may specify one or more policies to apply to a data stream subscription. The policies may specify additional criteria to apply for filtering of event messages. Examples of policies include a policy to filter out event messages that do not meet a threshold (e.g., temperature data points from a thermostat that are below 35 degrees Celsius), a policy to only permit every $5^{th}$ event message from each device, a policy to only provide data points that are created between certain hours, and so on. These additional policies may be provided in the subscription request.

Each data stream subscription 280 may be a representational state transfer (REST) resource maintained by the subscription service 225. To create a new data stream subscription, subscription service 225 may generate a new data stream subscription identifier for the data stream subscription. Subscription service 225 may additionally generate a key usable to connect to a streaming data feed associated with the data stream subscription.

The data stream subscription 280 may be a data structure or file that contains selection criteria for data filtering as well as the key generated for the data stream subscription. Additionally, the data stream subscription 280 may include a data stream subscription ID, an account ID of an account associated with the data stream subscription, a name assigned to the data stream subscription, a description assigned to the data stream subscription, an indicator of when the subscription was created and the last time that it was updated, a client type associated with the subscription (which is used to determine whether a streaming data feed is to be persistent or temporary), and/or other information. The selection criteria (also referred to as filters) of the subscription results in all matching data (event messages 215) to be multiplexed into a single streaming data feed (also referred to as a data stream channel). Subscription service 225 may then send a message to the requestor that includes an identifier of the data stream subscription as well as the key.

In one embodiment, data stream subscriptions are implemented using a JSON format. An example subscription may have the following format:

```
{
    "subscription": {
        "id": 48,
        "oem": "0dfc7900",
        "dsn": "AC000W000015582",
        "name": "name1",
        "description": "description1",
        "property_name": "*",
        "is_suspended": false,
        "created_at": "2015-07-08T01:35:47Z",
        "updated_at": "2015-07-08T01:35:47Z",
        "date_suspended": null,
        "oem_model": "ledevb",
        "stream_key": "3180b8c6e08a4b73a3befbb575440eaa",
        "client_type": "cloud",
        "subscription_type": "datapoint"
    }
}
```

In the example data stream subscription above, the data stream subscription has data stream ID 48, and is associated with a particular OEM user account having the value "0dfc7900". The example data stream subscription has a user selected name of name) and a user generated description of description1. The data stream subscription has a property_name of "*" (a wildcard) and an OEM_model of "ledevb". Accordingly, the example data stream subscription is for all device properties of all devices of the particular OEM device model having the value of "ledevb". The data stream subscription has a client_type of "cloud", indicating that the data stream subscription is for a permanent streaming data feed (as opposed to a temporary streaming data feed as described earlier). The data stream subscription further includes a stream_key value, which indicates the particular key usable to access the streaming data feed associated with the data stream subscription. Additionally, the data stream subscription includes a subscription_type of "datapoint", indicating that the type of event messages to be streamed are data point event messages.

In embodiments, the subscription service 225 provides a fine granularity of filters to data subscriptions. Subscriptions may be set up with filters that provide data from one device, a group of devices, one or more specified parameters of a single device, one or more specified parameters of a group of devices, and so on. Thus, subscribers such as OEM partners are able to subscribe to specific IoT device data that they are interested in processing.

Subscription filters may be used, for example, to filter on event types. Examples of event types include registration events (e.g., when a device is registered to a user account), connectivity events (e.g., when a device gains or loses network connection), and data point events (e.g., when a property of a device is updated). Subscription filters may also be used to filter by device model, by device property, by device group, and so on. Wildcard support is provided to enable collections of devices, properties and models.

The message dispatcher 210 functions as a buffer between upstream data sources (e.g., devices 208) and the downstream components of the data stream system 205. In one embodiment, the message dispatcher 210 functions primarily in memory and does not use a file system for data. Thus, the message dispatcher 210 receives event messages 235 (e.g., device data) and dispatches the event messages 235 into the data stream system 205.

The message dispatcher 210 is designed to dispatch event messages 235 into the data stream system 205 while alleviating back-pressure on upstream data sources (e.g., on device management service 202). The device data (e.g., event messages 235) from IoT devices 208 may arrive into the IoT platform (e.g., into the device management service 202) at consistently high speed from all over the world. It is beneficial to relieve any back-pressure on the data stream source. That means that neither the message dispatcher 210 nor the device management service 202 slows down the intake of data into the IoT platform in embodiments. Accordingly, in one embodiment the message dispatcher 210 is optimized to use multiple threads, and to process data in memory to create a high speed buffer that the data stream system 205 can consume. The way in which the message dispatcher 210 buffers data in memory results in a consistent high speed data source decoupled from the upstream sources that may be less consistent.

The data stream service (DSS) 215 handles all persistent transmission control protocol (TCP)/secure sockets layer (SSL) connections to subscribers. Each connection asynchronously pushes data from the IoT platform (e.g., from the data stream system 205) to a remote client over an SSL encrypted channel in real-time or near real-time.

In one embodiment, the data streaming service 215 exposes a WebSocket endpoint that subscribers 240A-N can connect to. The endpoint may use a key (e.g., a 32 character stream key, a 64 character stream key, etc.) that was provided in the subscription response. To establish a connection to a streaming data feed 212A-N, a subscriber 240A-N sends a connection request to a particular uniform resource identifier (URI) associated with a data stream subscription along with the key. In one embodiment, the key is passed as a hypertext transport protocol (HTTP) request parameter in a request URI. In one embodiment, the data streaming service 215 may use the key to authenticate the connection. Data streaming service 215 compares the received key to a key associated with the data stream subscription for which a connection is requested. If the keys match, then data streaming service 215 instantiates an associated streaming data feed for the data stream subscription 280, and connects the subscriber to the streaming data feed. For example, subscriber 240A may be connected to streaming data feed 212A, subscriber 240B may be connected to streaming data feed 212B, and subscriber 240N may be connected to streaming data feed 212N. Invalid keys may be filtered by data streaming service 215, and an HTTP 403 Forbidden message may be returned to the subscriber.

The data streaming service 215 maintains long lived connections to subscribers (e.g., partners) for the purpose of transmitting egress data from the IoT platform (e.g., from device management service 202). In one embodiment, the connections are transmission control protocol (TCP) connections. In one embodiment, the TCP connections are WebSockets. In one embodiment, a non-blocking/asynchronous WebSocket model is used that is capable of supporting many concurrent WebSocket connections. One example of such a WebSocket model that may be used is Netty®. In other embodiments, the TCP connections are plain hypertext transfer protocol (HTTP) connections. The TCP connections may also be connections that use any other protocol that will allow non-blocking I/O communications.

In one embodiment, instantiating a streaming data feed 212A-N involves generating a message queue (e.g., message queue 220A, 220B, 220N) and/or a replay buffer (e.g., replay buffer 230A, 230B, 230N). The message queue 220A-N is a durable queue that functions as a transient place for data to be temporarily stored before it is transmitted to a subscriber 240A-N. In one embodiment, event messages are stored in message queues 220A-N and processed in a first-in-first-out (FIFO) manner. The data (event messages 235) that is selected for queuing depends on a data stream subscription 280 associated with the streaming data feed of the message queue.

In one embodiment, the message queue 220 employed in the system is a topic/exchange based messaging system configured to use publish/subscribe messaging. Thus, device management system 202 may act as a publisher, and does not program the event messages to be sent directly to specific subscribers, but instead provides event messages that are divided into classes (e.g., based on devices, device properties, event types, etc.) without knowledge of which subscribers, if any, there may be. Similarly, subscribers may express interest in one or more classes (e.g., based on devices, device properties, event types, etc.) and only receive messages that are of interest, without knowledge of which publishers, if any, there are.

Once connected to a streaming data feed 212A-N, the subscriber 240A-N will asynchronously receive data (event messages 235A-N) from the streaming data feed 212A-N that matches the filters specified in the data stream subscription 280. For example, devices 208 generate event messages 235 and send the event messages to device management service 202. Device management service 202 then sends the event messages 235 on to message dispatcher 210.

For each of the data stream subscriptions 280, data streaming service 215 determines the filters associated with the data stream subscription. For each data stream subscription, data streaming service 215 then determines which of the event messages 235 match the filters for that data stream subscription and places such event messages into the message queue 220A-N of the streaming data feed 212A-N associated with that data stream subscription. Event messages 235A are then sent from message queue 220A to subscriber 240A. A different set of event messages 235B are sent from message queue 220B to subscriber 240B. Additionally, a different set of event messages 235N are sent from message queue 220N to subscriber 240N. Thus, each subscriber 240A-N may receive only the messages that match the message criteria specified by the subscriber in a subscription request.

In one embodiment, the subscriber 240A-N and data streaming service 215 will periodically transfer keep-alive messages to keep the connection established during the periods of inactivity of data flow. In one embodiment, data is transmitted from the streaming data feeds 212A-N in the JSON message format.

An example event message may be a datapoint JSON message that appears as follows:

```
{
    "seq": "1",
    "meta_data": {
        "oem_id": "0dfc7900",
        "oem_model": "ledevb",
        "dsn": "AC000W000015582",
        "property_name": "temperature",
        "display_name": "temperature",
        "base_type": "string",
        "event_type": "datapoint"
    },
    "datapoint": {
        "id": "5f782b20b66740dc984452d2591577f5",
        "updated_at": "2015-02-24T01:26:51Z",
        "created_at": "2015-02-24T01:26:51Z",
        "echo": false,
        "fetched_at": null,
        "closed": false,
        "value": "1"
    }
}
```

In the example even message, the event message has a sequence identifier of 1 and was produced by a device 208 manufactured by an OEM having oem_id of "0dfc7900" and was a device model having oem_model of "ledevb" and a device serial number (DSN) of "AC000W000015582". The event message was for a property called "temperature", which has a value that is provided as a string, and which has an event type of "datapoint." The value of the datapoint is 1. The datapoint was updated on 2015-02-24 at 01:26:51 and was created on 2015-02-24 at 01:26:51.

A subscriber 240A-N can disconnect from the data streaming service 215 at any time. The data streaming service 215 may maintain the streaming data feed 212A-N and continue to enqueue data messages that match the data stream subscription into the appropriate message queue 220A-N after the disconnection if the data stream subscription is for a permanent streaming data feed. Upon reconnecting to the data streaming service 215, the subscriber will receive any messages that have been queued (not yet delivered to client), and will continue to receive any new messages asynchronously in real-time. Alternatively, the data streaming service 215 may delete the message queue 220A-N after the disconnection if the data stream subscription is for a temporary streaming data feed.

In one embodiment, the each streaming data feed 212A-N includes a replay buffer 230A-N. A separate replay buffer may be maintained for each data stream subscription. In one embodiment, the replay buffer 230A-N is designed to hold 24 hours of data that has already been transmitted to the subscriber 240. The subscriber 240 can request data to be replayed from the last 24 hours (or other time period) when they reconnect to the data streaming service 215. To request replay data, the client can append additional request parameters to the HTTP Request URI. The additional request parameters may include a starting sequence identifier and/or an ending sequence identifier. The data streaming service 215 will then transmit the sequence of data messages in the requested range (the event messages having sequence identifiers including and between the starting sequence identifier and the ending sequence identifier).

Each streaming data feed 212A-N (e.g., each client connection) may have a circular replay buffer that is dynamically sized. In one embodiment, to establish the replay buffer sizes, the data streaming service 215 samples every active streaming data feed periodically. Based on the amount of data that occurred during the sampling interval, data streaming service 215 may extrapolate the expected amount of data into a larger time period (e.g., into a 24 hour day). IoT devices tend to have a fixed rate of generating event messages (e.g., of updating the cloud with the device state), so resampling the buffer window every 5 minutes should converge on a steady-state buffer size that can accommodate data in a specified amount of time. Thus, data streaming service 215 determines the appropriate size for each replay buffer. Data streaming service 215 optimizes the memory allocations to accommodate both slow devices (which will have a shorter replay buffer) as well as fast devices (which will have a longer replay buffer).

Figure 3:
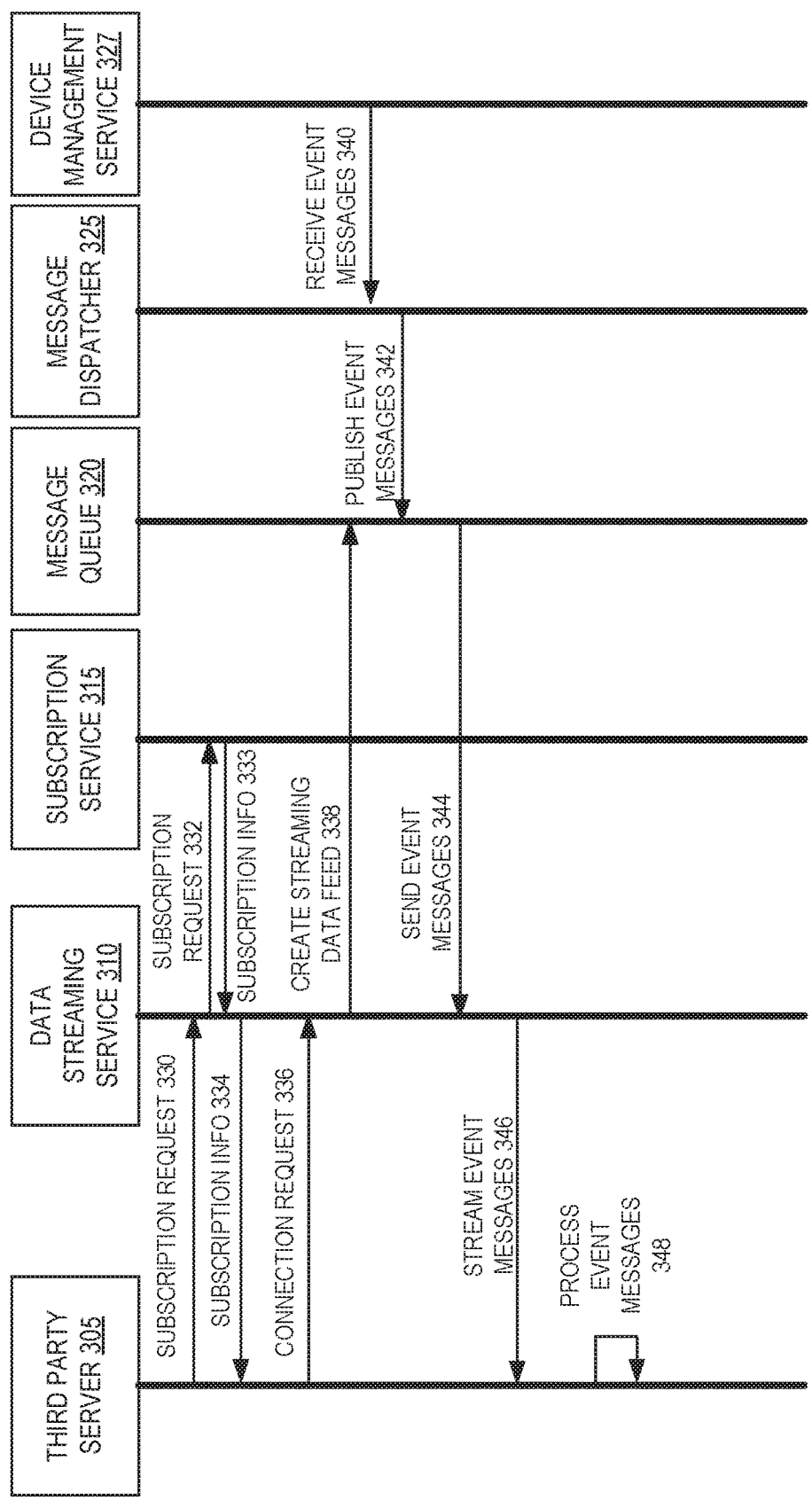
FIG. 3 is a sequence diagram illustrating interactions between components of a data stream system, in accordance with one embodiment.

FIG. 3 is a sequence diagram illustrating interactions between components of a data stream system, in accordance with one embodiment. The sequence diagram includes a third party data server 305, a data streaming service 310, a subscription service 315, a message queue 320, a message dispatcher 325 and a device management service 327.

To establish a data stream subscription, the third party server 305 sends a subscription request 330 to data streaming service 310. Data streaming service 310 may then forward the subscription request 332 to subscription service 315. Alternatively, third party server 305 may send the subscription request to subscription service 315. The subscription request may identify the device data that is to be streamed, including specified devices, specified device properties, specified event message types, and so on.

Subscription service 315 determines whether the third party server has permissions to stream the device data specified in the subscription request. Such a determination may be made by interfacing with a RBAC service and/or by comparing the subscription request to previously generated access grants. If the third party server does have permission to receive a stream of the requested device data, subscription service 315 generates a new data stream subscription. This may include generating a stream key for the data stream subscription, assigning a subscription identifier for the data stream subscription, determining a URI for the data stream subscription, and/or determining additional information for the data stream subscription. The information for the data stream subscription (e.g., the stream key) may then be sent 333 to data streaming service 310. The data streaming service 310 may then forward 334 the information to the third party server 305. Alternatively, subscription service 315 may send the information to third party server 305.

Once the third party server 305 has received the information for the data stream subscription, third party server 305 may use the information to send a connection request 336 to data streaming service 310. The connection request may be directed to a provided URI and may include the stream key associated with the data stream subscription.

Data streaming service 310 compares the received stream key to the stream key associated with the data stream subscription. If the stream keys match, data streaming service 310 creates a streaming data feed for the data stream subscription 338. This may include establishing message queue 320 for the data stream subscription.

Device management service 327 receives device data in the form of event messages from many different network connected devices. Device management service 327 sends the event messages 340 to message dispatcher 325. Message dispatcher 325 determines the filters associated with the data stream subscription (and with the message queue 320), and applies the filters to the event messages. Message dispatcher 325 then publishes those event messages that satisfied the criteria of the filters to message queue 320.

Message dispatcher 325 may publish messages to multiple different message queues. For each message queue the message dispatcher 325 may determine a different set of filters to apply and then apply those filters to the event messages. Accordingly, each message queue may receive a different set of event messages. In one embodiment, additional message dispatchers may be instantiated responsive to an increased amount of event messages and/or an increased number of message queues to service.

Message queue 320 sends the published event messages 344 to data streaming service 310. In one embodiment, message queue 320 sends the event messages in a batch format. For example, message queue 320 may wait until a threshold amount of event messages (e.g., 100 event messages) and/or a threshold amount of data is received, and then send multiple event messages in a single batched message. In one embodiment, message queue 320 sends event messages within a threshold time period from when those event messages are added to the message queue 320.

Data streaming service 310 streams the event messages 346 to the third party server 346. The event messages 346 may be sent to the third party server 305 in near real time as the event messages are produced by devices. Near real time as used herein means within a threshold amount of time from when the event messages were created (e.g., within less than 1 second from when the event messages are created, within 1 second from when the event messages are created, etc.). The third party server 305 may then process the event messages 348 as they are received. Accordingly, third party server 305 may perform analytics on event messages in near real time as those event messages are created by devices.

Figure 4A:
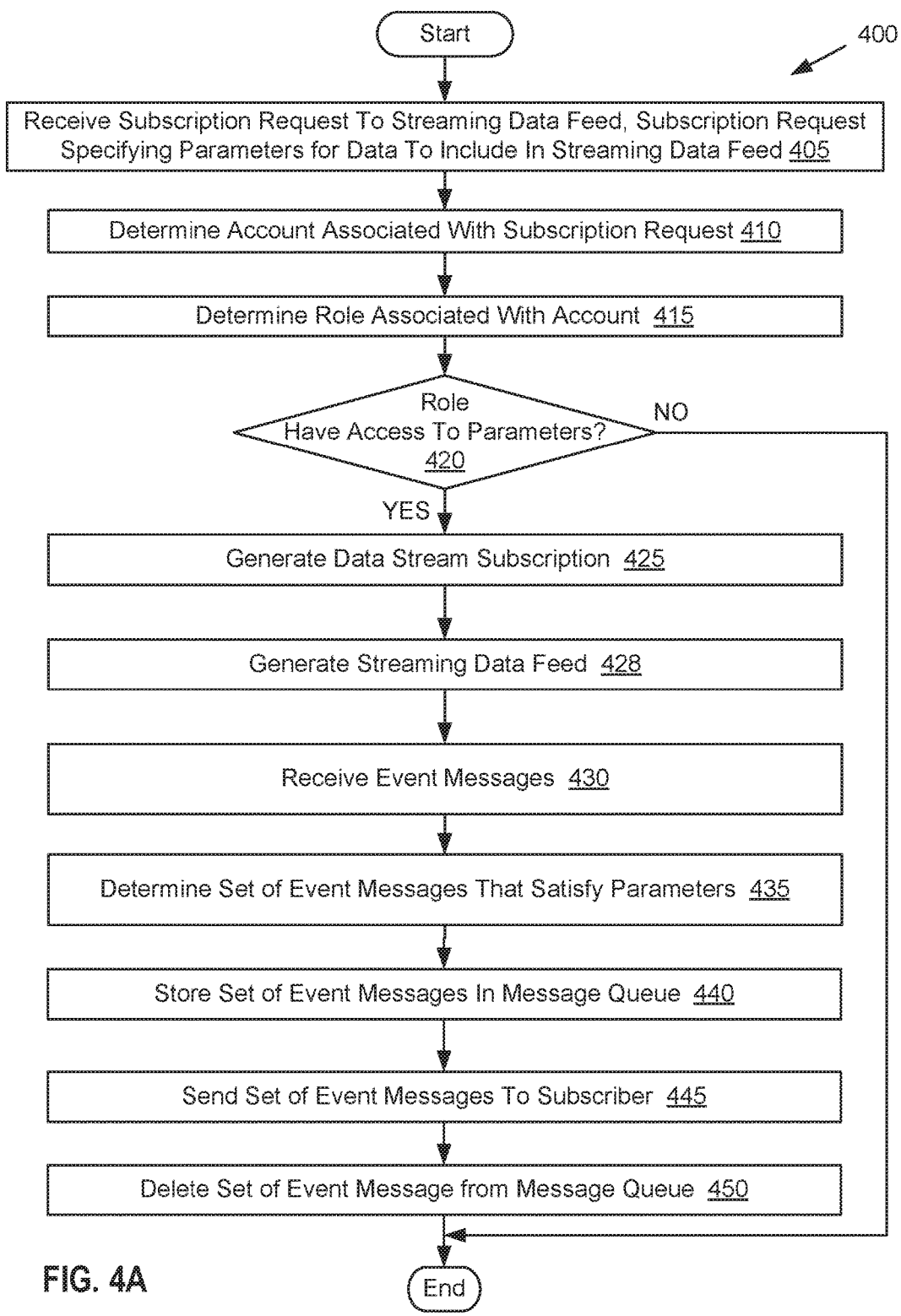
FIG. 4A is a flow chart illustrating one embodiment for a method of providing a stream of device event messages to a subscriber.
Figure 4B:
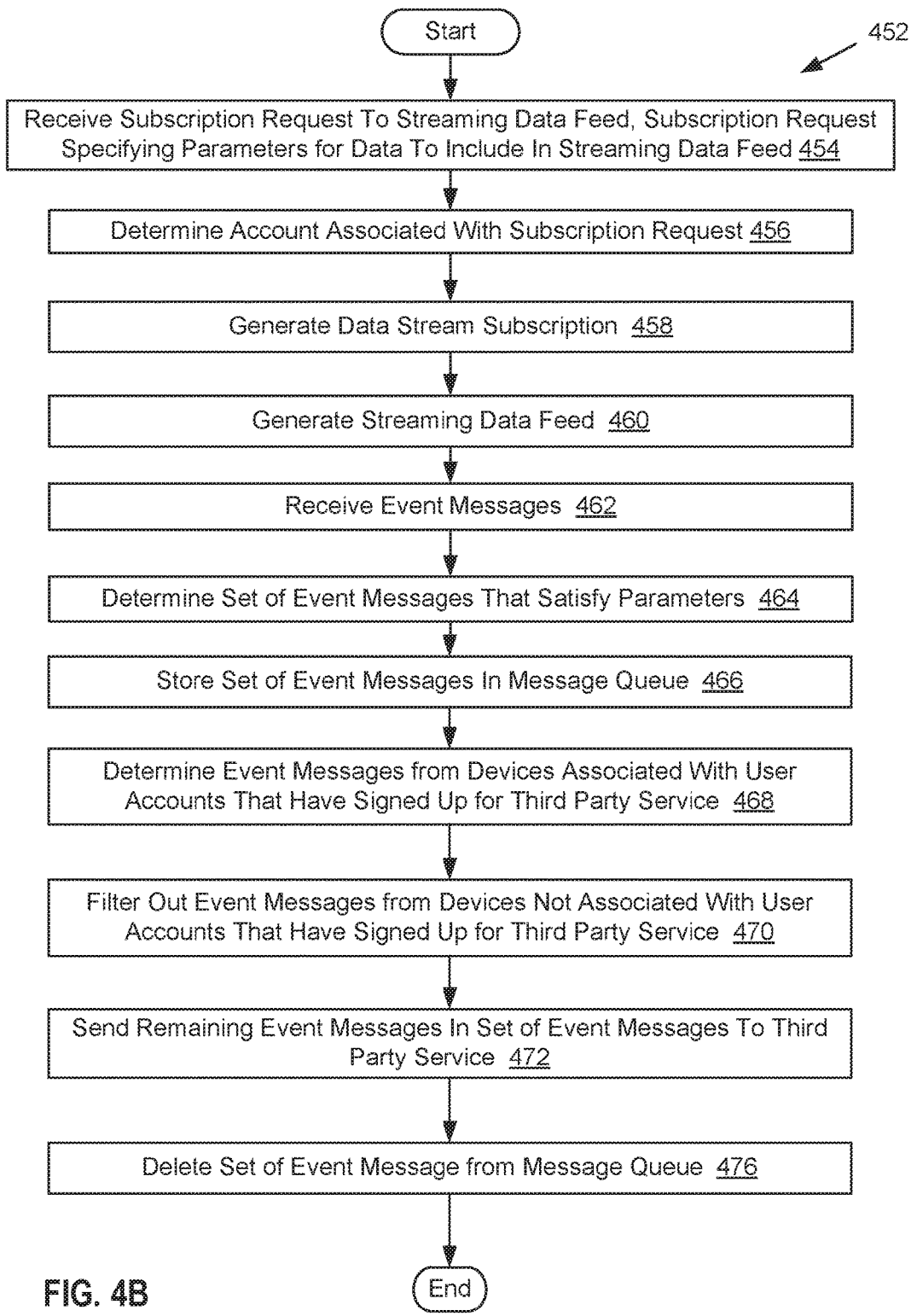
FIG. 4B is a flow chart illustrating another embodiment for a method of providing a stream of device event messages to a subscriber.
Figure 5:
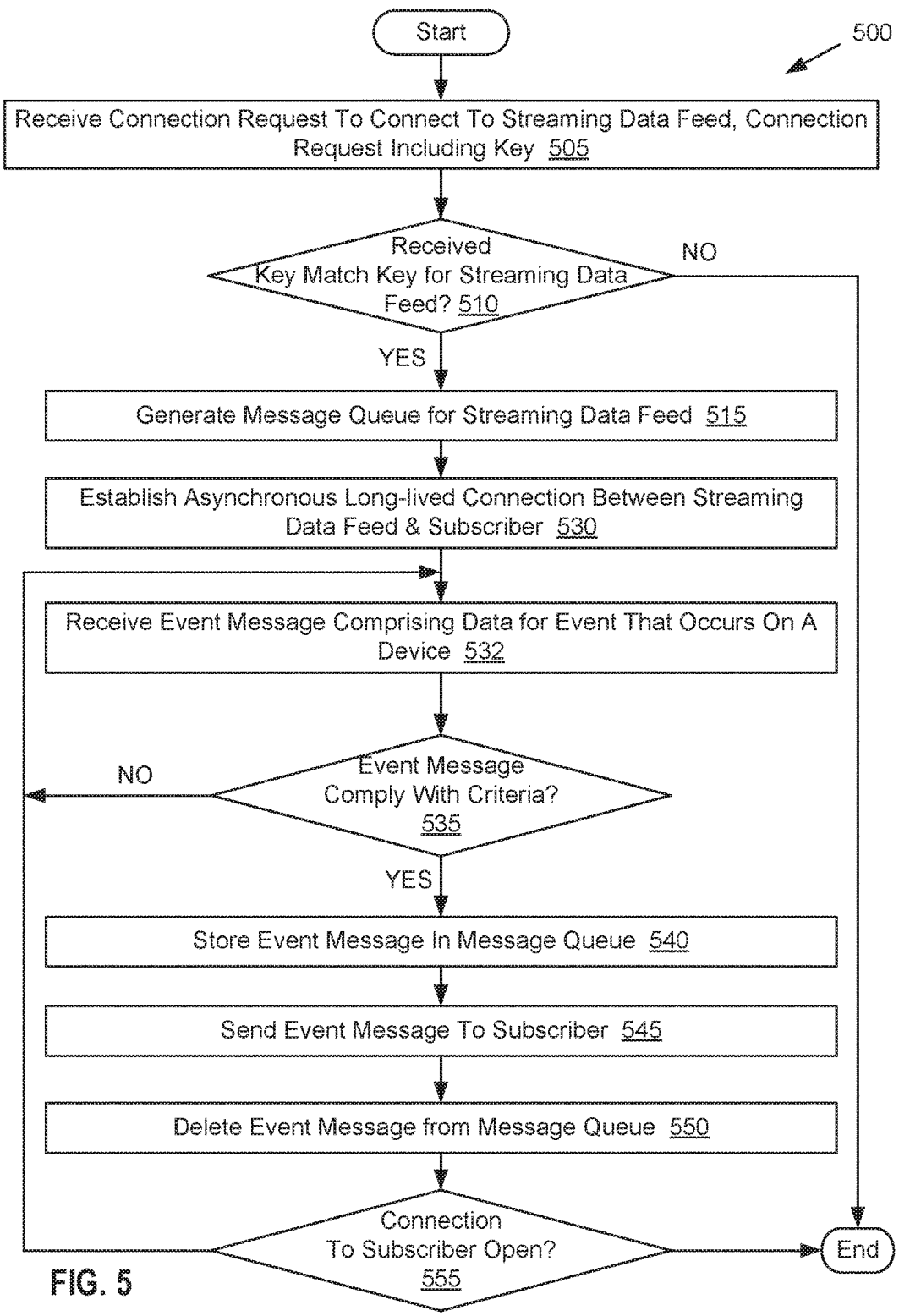
FIG. 5 is a flow chart illustrating another embodiment for a method of providing a stream of device event messages to a subscriber.
Figure 6:
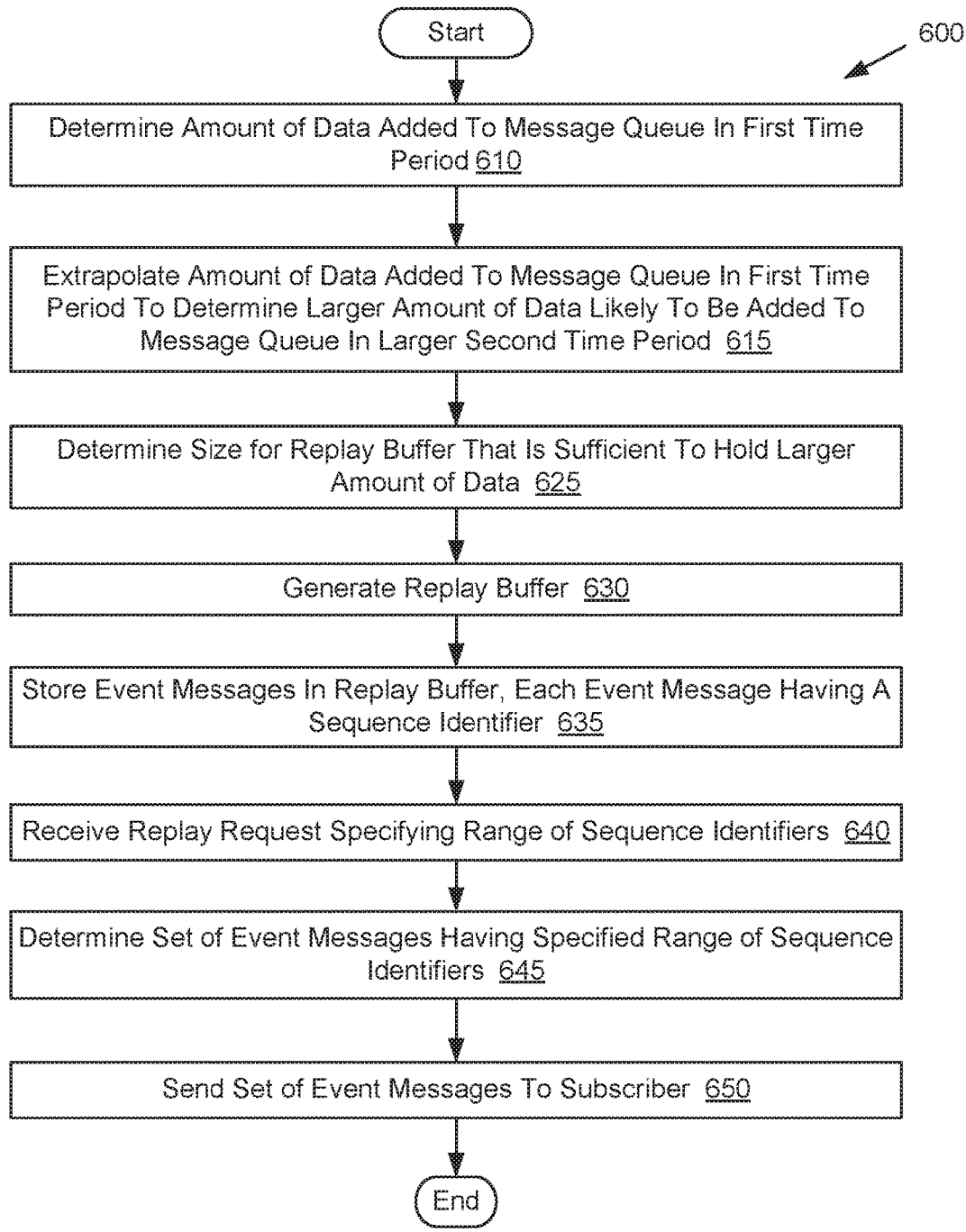
FIG. 6 is a flow chart illustrating one embodiment for a method of using a replay buffer.

FIGS. 4-6 are flow diagrams showing various methods of streaming device data from an IoT platform to third parties using a publish-subscribe mechanism. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a server computing device executing a data stream system (e.g., server computing device 125 of FIG. 1).

FIG. 4A is a flow chart illustrating one embodiment for a method 400 of providing a stream of device event messages to a subscriber. At block 405 of method 400 processing logic receives a subscription request to a streaming data feed from a requestor. The subscription request may specify parameters for the streaming data feed, such as an indication of devices to stream event messages from, specific device properties to stream event messages for, specific types of event messages to stream, groups of devices to stream event messages from, and/or other resources. At block 415, processing logic determines a role associated with an account that the requestor is logged into. In one embodiment, the subscription request includes a token sent to the requestor by an authentication service when the requestor completed authentication.

At block 420, processing logic determines whether the role has access to stream data associated with the requested parameters. In one embodiment, processing logic uses the provided token to determine whether the requestor has the requested access. In one embodiment, processing logic determines whether the requestor is associated with a role for which an express access grant has been provided for the requested parameters. If the role has access to stream the data having the specified parameters, the method proceeds to block 425. Otherwise the method ends.

At block 428, processing logic generates a data stream subscription for the requestor. Accordingly, the requestor may become a subscriber at this point. The data stream subscription may include filters that specify criteria for device data that is to be included in a streaming data feed for the requestor. At block 428, processing logic generates the streaming data feed responsive to a connection request from the requestor. This may include generating a message queue associated with the data stream subscription.

At block 430, processing logic receives event messages. At block 435, processing logic determines a set of event messages that satisfy the parameters (that satisfy the criteria of the filters). At block 440, processing logic stores the set of the event messages that satisfy the parameters in the message queue. At block 445, processing logic sends the set of event messages to the subscriber. The event messages may be sent from the message queue on a first in first out basis. In one embodiment, two or more event messages may be batched and sent together. At block 450, processing logic deletes the set of event messages from the message queue. The event messages may be deleted as they are sent to the subscriber.

FIG. 4B is a flow chart illustrating another embodiment for a method 452 of providing a stream of device event messages to a subscriber. At block 405 of method 400 processing logic receives a subscription request to a streaming data feed from a requestor. The subscription request may specify parameters for the streaming data feed, such as an indication of devices to stream event messages from, specific device properties to stream event messages for, specific types of event messages to stream, groups of devices to stream event messages from, and/or other resources. In some use cases, the requestor may be a third party service that contracts with an OEM to provide a service for devices manufactured by that OEM. Third party services may be consumer facing third party services for devices sold to consumers as well as third party services for non-consumer deployments. Some non-limiting examples of third party services include an energy management service, a safety monitoring service, a security service, an insurance service, and so on. The streaming data feed may be set up without knowledge of the specific devices whose data will be included in the streaming data feed. Accordingly, the streaming data feed may be for data from all devices of the OEM or for all devices of the OEM having a particular device type.

Processing logic may determine a role associated with an account that the requestor is logged into. In one embodiment, the subscription request includes a token sent to the requestor by an authentication service when the requestor completed authentication. Processing logic may determine whether the role has access to stream data associated with the requested parameters. In one embodiment, processing logic uses the provided token to determine whether the requestor has the requested access. In one embodiment, processing logic determines whether the requestor is associated with a role for which an express access grant has been provided for the requested parameters.

At block 458, processing logic generates a data stream subscription for the requestor. Accordingly, the requestor may become a subscriber at this point. The data stream subscription may include filters that specify criteria for device data that is to be included in a streaming data feed for the requestor. As set forth above, in some implementations the data stream subscription is for data from all devices manufactured by a particular OEM or for all devices of a particular device type manufactured by a particular OEM.

At block 460, processing logic generates the streaming data feed responsive to a connection request from the requestor. This may include generating a message queue associated with the data stream subscription.

Some device owners (users or enterprises) may elect to use the third party service, while other device owners may elect not to use the third party service. A user may opt-in or opt-out of the third party service, for example, from a web interface or a remote control application installed on a computing device (e.g., tablet or mobile phone) of the user.

At block 462, processing logic receives event messages. The event messages may be received from devices of both users who have elected to use the third party service and users who have elected not to use the third party service.

At block 464, processing logic determines a set of event messages that satisfy the parameters (that satisfy the criteria of the filters). These criteria/parameters are those criteria/parameters that were specified in the subscription request. However, the criteria/parameters may not pertain to whether or not a particular device owner has signed up to use the third party service.

At block 466, processing logic stores the set of the event messages that satisfy the parameters/criteria in the message queue. At block 468, processing logic then determines which event messages are from devices of users (e.g., associated with user accounts) that have signed up for (opted in to) the third party service. At block 470, processing logic filters out those event messages that are from devices not associated with user accounts that have signed up for the third party service. In one implementation, the operations of blocks 468 and 470 are performed prior to the operations of block 466. Accordingly, in some implementations those event messages from devices associated with user accounts that have not signed up for the third party service may not be stored in the message queue.

At block 472, processing logic sends the remaining event messages in the set of event messages to the subscriber. These remaining event messages are for those event messages from devices of users or enterprises who have signed up for the third party service. The event messages may be sent from the message queue on a first in first out basis. In one embodiment, two or more event messages may be batched and sent together. At block 476, processing logic deletes the set of event messages from the message queue. The event messages may be deleted as they are sent to the subscriber.

In one example, the third party service requestor is an energy management service. The energy management service may monitor the characteristics of an HVAC system or other devices of a user as well as environmental conditions in a home of the user. The third party service may integrate with a demand-response system through a local utility. The third party service or the utility may then have an ability to trigger events that turn on or off the user's energy consuming devices to better distribute and manage their energy usage. The OEM can offer such a third party service (e.g., an energy management service) as an add-on feature or service to a consumer. That consumer may opt-in to the service to provide permission for the OEM to share that consumer's device data with the third party service. For example, a user may opt-in to the service one month, during which data from devices of the user may flow to the third party service. The user may opt-out of the service the next month, during which data from devices of the user would not flow to the third party service.

Use of third party services along with opting in or opting out could be extended to non-consumer deployments as well.

FIG. 5 is a flow chart illustrating another embodiment for a method 500 of providing a stream of device event messages to a subscriber. At block 505 of method 500 processing logic receives a connection request to connect to a streaming data feed. The connection request may include an indicator of the streaming data feed (e.g., a data stream subscription identifier) and/or a stream key. In one embodiment, the connection request is sent by a subscriber to a URI associated with the data stream subscription.

At block 510, processing logic compares the received stream key to a stored stream key associated with the data stream subscription. If the two keys match, then the subscriber has authorization to access the streaming data feed and the method continues to block 510. Otherwise, the method ends.

At block 515, processing logic generates a message queue for the requested streaming data feed. At block 530, processing logic establishes an asynchronous long-lived connection between the streaming data feed and the subscriber. The connection may be, for example, a WebSocket connection. Other types of long-lived connections may also be established for streaming using streaming protocols other than HTTP or WebSockets.

At block 532, processing logic receives an event message comprising data for an event that has occurred on a device. At block 535, processing logic determines whether the event message complies with criteria specified in filters associated with the streaming data feed. If the event message complies with the criteria, the method continues to block 540. Otherwise the method returns to block 532.

At block 540, processing logic stores the event message in a message queue associated with the streaming data feed. At block 545, processing logic sends the event message to the subscriber. At block 550, processing logic deletes the event message from the message queue. At block 555, processing logic determines whether there is still an open connection to the subscriber. If there is an open connection, the method returns to block 532. Otherwise the method ends.

FIG. 6 is a flow chart illustrating one embodiment for a method 600 of using a replay buffer. At block 610 of method 600, processing logic determines an amount of data added to a message queue associated with a streaming data feed in a first time period. The first time period may be, for example, 10 seconds, 15 seconds, 1 minute, 10 minutes, and so on. At block 615, processing logic extrapolates the amount of data added to the message queue in the time period to determine a larger amount of data likely to be added to the message queue in a larger second time period. The larger time period may be, for example, 1 hour, 12 hours, 24 hours, etc. In one embodiment, the second time period is divided by the first time period. The result may then be multiplied by the amount of data added to the message queue in the first time period to determine the amount of data likely to be added to the message queue in the second time period.

At block 625, processing logic determines a size of a replay buffer that is sufficient to hold the larger amount of data likely to be added to the message queue in the second time period. The determined size may be at least equal to the amount of data likely to be added to the message queue in the second time period. At block 630, processing logic then generates a replay buffer having the determined size.

At block 635, processing logic stores event messages in the replay buffer. Copies of event messages may be added to the replay buffer as those event messages are added to a message queue until the replay buffer is full. At that point as each new event message is received and added to the message queue, an oldest event message in the replay buffer may be deleted and the new event message may be added to the replay buffer. Each event message in the replay buffer may have a sequence identifier. Sequence identifiers may be added to event messages as those event messages are added to a message queue. The sequence identifiers may specify the order in which the event messages occurred and/or the order in which they were received by the message queue.

At block 640, processing logic receives a replay request specifying a range of sequence identifiers. In one embodiment, the replay request specifies a starting sequence identifier and an ending sequence identifier. Alternatively, the replay request may simply specify a starting sequence identifier or may simply specify an ending sequence identifier.

At block 645, processing logic determines a set of event messages having the specified range of sequence identifiers. If only a starting sequence identifier was received, processing logic determines a set of event messages having sequence identifiers from the starting sequence identifier to the last sequence identified included in the replay buffer. If only an ending sequence identifier was specified, processing logic determines a set of event messages having sequence identifiers from the first sequence identifier in the replay buffer to the ending sequence identifier. At block 650, processing logic sends the set of event message to the subscriber. In one embodiment, the set of event messages are sent in sequential order based on their sequence identifiers.

Figure 7:
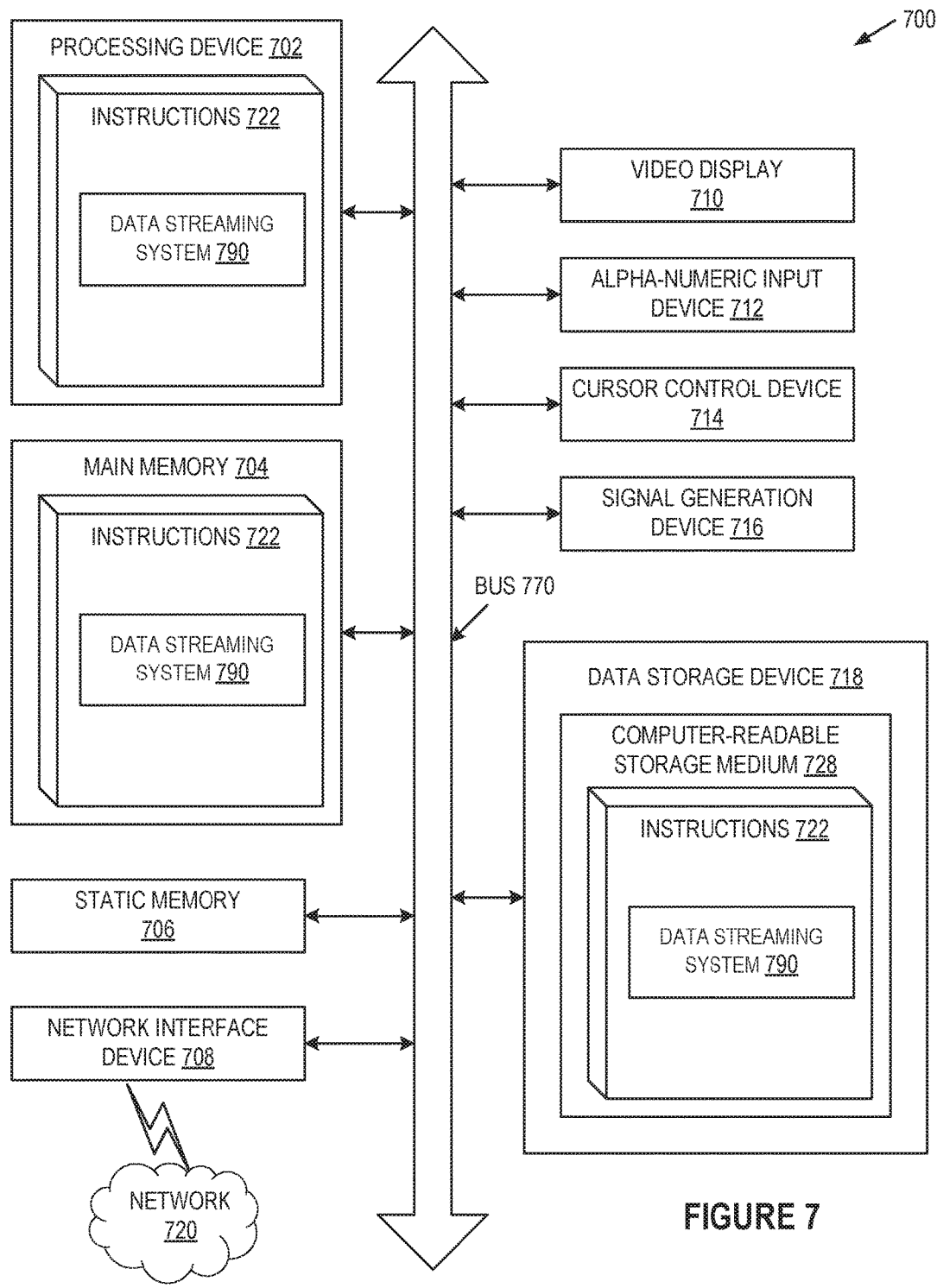
FIG. 7 illustrates a block diagram of one embodiment of a computing device.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium (or more specifically a computer-readable storage medium) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The computer-readable storage medium 728 may also be used to store a data streaming system 790 (as described with reference to FIG. 2), and/or a software library containing methods that call a data streaming system 790. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "authenticating", "determining", "causing", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of data streaming for an internet-of-things platform comprising:
    receiving, by a processing device, a subscription request to a streaming data feed, the subscription request specifying one or more devices and at least one device property;
    generating the streaming data feed, the streaming data feed comprising a queue;
    receiving a plurality of event messages, each of the plurality of event messages comprising data for an event that occurred on a device;
    determining, by the processing device, a set of event messages from the plurality of event messages in view of the one or more devices and the at least one device property specified in the subscription request, wherein event messages in the set of event messages are associated with the one or more devices and the at least one device property specified in the subscription request, and the at least one device property includes at least one of an attribute, a setting, or a parameter of the one or more devices;
    storing the set of event messages in the queue;
    sending at least a subset of the set of event messages to a subscriber; and
    deleting the set of event messages from the queue.

2. The method of claim 1, wherein the each of the one or more devices comprises an embedded system, the method further comprising performing the following prior to generating the streaming data feed:
    determining an account associated with the subscription request;
    determining a role associated with the account; and
    determining that the role has permission to stream data from the one or more devices and to stream data for the at least one device property.

3. The method of claim 1, further comprising:
    generating a group for a plurality of devices having at least one of the device property, a shared device type, a shared location or a shared owner, wherein the group comprises the one or more devices and the streaming data feed is for the group;
    wherein determining the set of event messages that are associated with the one or more devices and the at least one device property comprises determining that the set of event messages are associated with the group.

4. The method of claim 1, further comprising:
    generating a first key associated with the streaming data feed;
    sending the first key to the subscriber;
    receiving a connection request to establish a connection to the streaming data feed, the connection request comprising a second key;
    determining whether the first key matches the second key; and
    establishing an asynchronous long-lived connection between the streaming data feed and the subscriber responsive to determining that the first key matches the second key.

5. The method of claim 1, further comprising:
    determining an amount of data added to the queue in a time period;
    determining a size for a replay buffer that is sufficient to hold the amount of data added to the queue in the time period;
    generating the replay buffer in accordance with the size; and
    storing the set of event messages in the replay buffer.

6. The method of claim 5, further comprising:
    determining a new amount of data added to the queue in a subsequent time period;
    determining a new size for the replay buffer based on the new amount of data added to the queue in the subsequent time period; and
    resizing the replay buffer in accordance with the new size.

7. The method of claim 5, wherein each event message in the set of event messages comprises a sequence identifier, the method further comprising:
    receiving a replay request to replay event messages, the replay request comprising a specified range of sequence identifiers;
    determining an additional set of event messages having the specified range of sequence identifiers; and
    sending the additional set of event messages to the subscriber in sequence.

8. The method of claim 1, further comprising:
  determining a policy to apply to the streaming data feed, wherein the policy comprises a criterion associated with content of event messages;
  receiving a new plurality of event messages;
  determining a new set of event messages from the new plurality of event messages, wherein event messages in the new set of event messages are associated with the one or more devices and the at least one device property;
  determining, from the new set of event messages, a subset of event messages that comply with the criterion; and
  sending the subset of event messages to the subscriber.

9. The method of claim 1, wherein the subscriber is a third party service, the method further comprising:
  determining the subset of the set of event messages that are associated with user accounts that have opted in to use the third party service, wherein event messages from the set of event messages that are not in the subset are not sent to the third party service.

10. A computing device to stream data for an internet-of-things platform comprising:
  a memory; and
  a processing device operatively coupled to the memory, the processing device to:
  receive a subscription request to a streaming data feed, the subscription request specifying one or more devices and at least one device property;
  generate the streaming data feed, the streaming data feed comprising a queue in the memory;
  receive a plurality of event messages, each of the plurality of event messages comprising data for an event that occurred on a device;
  determine a set of event messages from the plurality of event messages in view of the one or more devices and the at least one device property specified in the subscription request, wherein event messages in the set of event messages are associated with the one or more devices and the at least one device property specified in the subscription request, and the at least one device property includes at least one of an attribute, a setting, or a parameter of the one or more devices;
  store the set of event messages in the queue;
  send the set of event messages in the queue to a subscriber; and
  delete the set of event messages from the queue.

11. The computing device of claim 10, wherein the each of the one or more devices comprises an embedded system, the and wherein the processing device is further to perform the following prior to generating the streaming data feed:
  determine an account associated with the subscription request;
  determine a role associated with the account; and
  determine that the role has permission to stream data from the one or more devices and to stream data for the at least one device property.

12. The computing device of claim 10, wherein the processing device is further to:
  generate a group for a plurality of devices having at least one of the device property, a shared device type, a shared location or a shared owner, wherein the group comprises the one or more devices and the streaming data feed is for the group;
  wherein determining the set of event messages that are associated with the one or more devices and the at least one device property comprises determining that the set of event messages are associated with the group.

13. The computing device of claim 10, wherein the processing device is further to:
  generate a first key associated with the streaming data feed;
  send the first key to the subscriber;
  receive a connection request to establish a connection to the streaming data feed, the connection request comprising a second key;
  determine whether the first key matches the second key; and
  establish an asynchronous long-lived connection between the streaming data feed and the subscriber responsive to determining that the first key matches the second key.

14. The computing device of claim 10, wherein the processing device is further to:
  determine an amount of data added to the queue in a time period;
  determine a size for a replay buffer that is sufficient to hold the amount of data added to the queue in the time period;
  generate the replay buffer in accordance with the size; and
  store the set of event messages in the replay buffer.

15. The computing device of claim 14, wherein the processing device is further to:
  determine a new amount of data added to the queue in a subsequent time period;
  determine a new size for the replay buffer based on the new amount of data added to the queue in the subsequent time period; and
  resize the replay buffer in accordance with the new size.

16. The computing device of claim 14, wherein each event message in the set of event messages comprises a sequence identifier, and wherein the processing device is further to:
  receive a replay request to replay event messages, the replay request comprising a specified range of sequence identifiers;
  determine an additional set of event messages having the specified range of sequence identifiers; and
  send the additional set of event messages to the subscriber in sequence.

17. The computing device of claim 10, wherein the processing device is further to:
  determine a policy to apply to the streaming data feed, wherein the policy comprises a criterion associated with content of event messages;
  receive a new plurality of event messages;
  determine a new set of event messages from the new plurality of event messages, wherein event messages in the new set of event messages are associated with the one or more devices and the at least one device property;
  determine, from the new set of event messages, a subset of event messages that comply with the criterion; and
  send the subset of event messages to the subscriber.

18. A non-transitory computer readable storage medium to stream data for an internet-of-things platform comprising instructions that, when executed by a processing device, cause the processing device to perform operations comprising:
  receiving, by the processing device, a subscription request to a streaming data feed, the subscription request specifying one or more devices and at least one device property;
  generating the streaming data feed, the streaming data feed comprising a queue;

receiving a plurality of event messages, each of the plurality of event messages comprising data for an event that occurred on a device;

determining, by the processing device, a set of event messages from the plurality of event messages in view of the one or more devices and the at least one device property specified in the subscription request, wherein event messages in the set of event messages are associated with the one or more devices and the at least one device property specified in the subscription request, and the at least one device property includes at least one of an attribute, a setting, or a parameter of the one or more devices;

storing the set of event messages in the queue;

sending the set of event messages in the queue to a subscriber; and deleting the set of event messages from the queue.

19. The non-transitory computer readable storage medium of claim 18, wherein the each of the one or more devices comprises an embedded system, the operations further comprising performing the following prior to generating the streaming data feed:

determining an account associated with the subscription request;

determining a role associated with the account; and determining that the role has permission to stream data from the one or more devices and to stream data for the at least one device property.

20. The non-transitory computer readable storage medium of claim 18, the operations further comprising:

generating a group for a plurality of devices having at least one of the device property, a shared device type, a shared location or a shared owner, wherein the group comprises the one or more devices and the streaming data feed is for the group;

wherein determining the set of event messages that are associated with the one or more devices and the at least one device property comprises determining that the set of event messages are associated with the group.

21. The non-transitory computer readable storage medium of claim 18, the operations further comprising:

determining an amount of data added to the queue in a time period;

determining a size for a replay buffer that is sufficient to hold the amount of data added to the queue in the time period;

generating the replay buffer in accordance with the size; and storing the set of event messages in the replay buffer.

* * * * *